W. R. WALKER.
SHAFT COUPLING.
APPLICATION FILED OCT. 27, 1920.

1,417,432.

Patented May 23, 1922.

UNITED STATES PATENT OFFICE.

WILLARD R. WALKER, OF SYRACUSE, NEW YORK, ASSIGNOR TO THE WALKER BROTHERS COMPANY, OF SYRACUSE, NEW YORK, A CORPORATION OF NEW YORK.

SHAFT COUPLING.

1,417,432.  Specification of Letters Patent.  Patented May 23, 1922.

Application filed October 27, 1920. Serial No. 419,790.

*To all whom it may concern:*

Be it known that I, WILLARD R. WALKER, of Syracuse, in the county of Onondaga, in the State of New York, have invented new and useful Improvements in Shaft Couplings, of which the following, taken in connection with the accompanying drawings, is a full, clear, and exact description.

This invention relates to a shaft coupling for transmitting rotary motion from one shaft to another, as, for example, in transmitting motion from the armature shaft of an electric motor to the impeller operating mechanism of a dishwashing machine.

In devices of this character it is desirable to couple the shaft sections so that they will be in exact coaxial alinement, but in many instances it is practically impossible to secure a perfect alinement without considerable trouble and expense, and the main object of my invention is to provide a coupling which will positively and effectively transmit rotary motion from one shaft to the other without perceptible lost motion or noise even though the shafts may be slightly out of alinement.

Another object is to provide a coupling of this type with a minimum number of parts which may be easily and quickly assembled and adjusted for use without special tools.

Other objects and uses relating to specific parts of the coupling will be brought out in the following description.

In the drawings:

Figure 1 is a longitudinal sectional view of a coupling embodying the features of my invention showing in elevation the adjacent ends of the shafts to which the coupling sections are secured.

Figure 2 is a transverse sectional view taken on line 2—2, Figure 1.

Figures 3 and 4 are perspective views of the detached coupling heads.

Figure 5 is a side elevation of the coupling and Figure 6 is a perspective view of the detached coupling disk between the heads.

This coupling comprises a pair of similar but reversely arranged end heads or collars —1— and —1'— secured by pins —2— and —2'— to the adjacent ends of separate shaft sections —a— and —a'—, which, in this instance, are coaxial but might be slightly out of alinement without affecting the practical operation of the coupling in transmitting motion from one shaft to the other.

The coupling head —1— is provided with a substantially circular socket —3— and a pair of diametrically opposite axially projecting lugs —4—, the head —1'— being provided with a similar substantially circular socket —3'— and a pair of diametrically opposite axially projecting lugs —4'— which are similar to the lugs —4—.

The coupling heads —1— and —1'— are reversely arranged upon their respective shafts —a— and —a'— with the open sides of the sockets facing each other and their adjacent ends spaced apart at —5— to establish a sufficient clearance to operate without contact with each other even though they may be slightly out of alinement.

The combined sockets —3— and —3'— form a substantially circular chamber surrounded by the walls or flanges as —6— and —6'— of the heads —1—, while the inner faces of the end walls of said sockets, aside from the lugs —4— and —4'—, are substantially flat and parallel at right angles to the axes of their respective shafts.

A disk —7— of substantially the same size and form as the chamber formed by the sockets —3— and —3'— is seated in said sockets to extend across the intervening space —5— with its end faces resting against the end walls of the sockets and its periphery engaged with the inner faces of the annular flanges —6—. When the coupling heads are secured to their respective shafts, they are adjusted so that the lugs —4— of one head will be disposed in a plane at right angles to those of the other head, while the disk —7— is provided with separate pairs of diametrically opposite recesses —8—, those of one pair being disposed at right angles to those of the other pair for receiving the lugs —4— and —4'— on the heads —1— and —1'—, that is the lugs —4— enter one pair of diametrically opposite recesses —8—, while the lugs —4'— enter the other pair of recesses, thereby locking the disk —7— to both of the heads —1— and —1'— to rotate therewith.

The disk —7— is preferably made of soft rubber or other resilient or pliable material capable of yielding slightly in case the coupling heads should not be in exact axial alinement with each other; another object of the resilient disk being to compensate for the changing positions of the heads relatively to each other in case they should not be in axial alinement when in operation, and also to avoid appreciable noise due to slight eccentricity of relative movement of the heads or imperfect fit of the lugs in their respective recesses.

These lugs are formed integral with their respective heads and project some distance inwardly beyond the inner ends of the flanges —6— and —6'— into their respective recesses —8—, the free ends of the lugs of each head terminating a short distance from the end wall of the socket of the other head to avoid friction therewith in the event that the shaft sections —a— and —a'— are not in exact alinement.

These lugs project inwardly and radially toward the center some distance from the flanges —6— and —6'—, but are of less radial depth than the distance between said flanges and the peripheries of the shaft sections —a— and —a'—, their outer ends being integrally united with the end and peripheral walls of the sockets of their respective heads, those of each pair being parallel with each other and with the axis of its corresponding head.

The inner faces of the lugs of each pair are substantially semi-circular in cross-section, and the portions thereof which project beyond the inner end of the corresponding flange, or those portions which engage the disk —7— are reduced in radial width so that their outer faces, as —9—, are spaced apart from the inner walls of the flanges —6— and —6'— to prevent frictional contact therewith in the event that the coupling heads —1— and —1'—are not in exact alinement when in operation.

The recesses —8— in the periphery of the disks —7— are of substantially the same cross-sectional form and size as the lugs —4— and —4'— which are seated therein, except that they are open at their outer ends and that their side walls extend outwardly beyond the outer edges of the portions of the lugs which project beyond the inner end of the flange of the corresponding head.

The object in rounding the inner edges of the lugs —4— and —4'— and adjacent faces of the recesses —8— of the disk —7— is to avoid as far as possible any cutting effect of the lugs upon the softer material of said disk, and, at the same time, to maintain a driving connection between each coupling head and the disk.

The recesses —8— constitute what may be termed lug holes for receiving the lugs —4— and —4'—, whereby rotary motion will be transmitted from either head to the disk, which latter, by reason of its resiliency, not only permits the parts of the coupling to operate without noise, but also compensates for any eccentricity of alinement and enables the driven head to be started by the driving head without excessive shock due to the resiliency of the disk, while, at the same time, the fact that the disk fits snugly within the sockets of both of the coupling heads and also snugly around the several lugs prevents any excessive distortion by expansion or compression of said disk when the coupling is in action and establishes a positive driving connection between the coupling heads.

What I claim is:

1. A coupling comprising a pair of rotary members arranged end to end in axially spaced relation and provided with substantially circular sockets in their adjacent ends forming annular flanges surrounding the sockets, a disk of resilient material extending into both sockets and seated against the end and peripheral walls thereof, said disk having a series of axially extending openings, and lugs on both of said members projecting into the openings in the disk, the lugs of each member being extended axially into the socket of the other member, the outer faces of the extensions of each member being spaced apart radially from the inner face of the flange of the other member to avoid contact therewith.

2. A shaft coupling comprising a pair of similar rotary members arranged end to end in spaced relation axially and having their adjacent ends provided with substantially circular sockets and substantially circular flanges surrounding the sockets, a flexible disk seated in said sockets and against the inner faces of the flanges and provided with a series of recesses opening from its periphery in uniformly spaced relation circumferentially, and lugs on both of said members seated in the recesses of the disk.

In witness whereof I have hereunto set my hand this 18th day of October, 1920.

WILLARD R. WALKER.

Witnesses:
H. E. CHASE,
E. M. FRADENBURGH.